United States Patent [19]

Blain et al.

[11] Patent Number: 5,217,635
[45] Date of Patent: Jun. 8, 1993

[54] DIISOCYANATE DERIVATIVES AS LUBRICANT AND FUEL ADDITIVES AND COMPOSITIONS CONTAINING SAME

[75] Inventors: David A. Blain, Mt. Laurel; Angeline B. Cardis, Florence, both of N.J.

[73] Assignee: Mobil Oil Corporation, Fairfax, Va.

[21] Appl. No.: 765,802

[22] Filed: Sep. 26, 1991

Related U.S. Application Data

[62] Division of Ser. No. 456,895, Dec. 26, 1989, Pat. No. 5,057,122.

[51] Int. Cl.$^5$ ............... C10M 133/06; C07C 261/00; C07C 269/00; C07C 271/00
[52] U.S. Cl. .................... 252/51.5 R; 560/158
[58] Field of Search ................... 560/158; 252/51.5 R

[56] References Cited

U.S. PATENT DOCUMENTS

| | | | |
|---|---|---|---|
| 4,160,648 | 7/1979 | Lewis et al. | 560/158 |
| 4,191,537 | 3/1980 | Lewis et al. | 560/158 |
| 4,197,409 | 4/1980 | Lilburn | 560/158 |
| 4,233,168 | 11/1980 | Lewis et al. | 560/158 |
| 4,274,837 | 6/1981 | Lilburn | 560/158 |
| 4,288,612 | 9/1981 | Lewis et al. | 560/158 |
| 4,293,470 | 10/1981 | Cuscurida | 560/158 |
| 4,329,240 | 5/1982 | Lilburn | 560/158 |
| 4,518,778 | 5/1985 | Cuscurida | 560/158 |
| 4,881,945 | 11/1989 | Buckley, III | 560/158 |
| 4,933,485 | 6/1990 | Buckley, III | 560/158 |
| 4,940,768 | 7/1990 | Hönel et al. | 560/158 |
| 5,053,153 | 10/1991 | Blain et al. | 252/51.5 R |
| 5,055,607 | 10/1991 | Buckley, III | 560/158 |
| 5,057,122 | 10/1991 | Blain et al. | 44/387 |
| 5,071,951 | 12/1991 | Ulrich et al. | 560/158 |

*Primary Examiner*—Jerry Johnson
*Attorney, Agent, or Firm*—Alexander J. McKillop; Malcolm D. Keen; Howard M. Flournoy

[57] ABSTRACT

Reaction products in which polyethers are connected to hydroxyalkylated polyamines using diisocyanates have been found to be effective ashless dispersants and detergents for various lubricants and fuels.

36 Claims, No Drawings

DIISOCYANATE DERIVATIVES AS LUBRICANT AND FUEL ADDITIVES AND COMPOSITIONS CONTAINING SAME

This is a division of Ser. No. 07/456,895, filed on Dec. 26, 1989, now U.S. Pat. No. 5,057,122.

BACKGROUND OF THE INVENTION

The present invention is directed to novel additive products and to their use in liquid hydrocarbyl fuels and lubricants as a means of cleaning and/or retarding the formation of deleterious deposits on certain moving parts of, for example, internal combustion engines. More particularly, the invention is directed to reaction products in which polyethers are connected to hydroxyalkylated polyamines via diisocyanates and to fuel and lubricant compositions containing same.

With the ever increasing demand for high performance engines to perform over long periods of time, it is necessary that the moving parts of such engines be maintained in as clean a state as possible, both to prolong the life of the engine and to prolong the life of the vehicle which it propels and to reduce down time and repair of said vehicle. Just to merely maintain satisfactory performance, the moving parts of the engine must not be fouled up or dirty.

Additives are an important means of providing this protection for internal combustion and other similar type engines. As is well known, they may give the fuel compositions new properties or they may enhance properties already present. Nevertheless, the art is constantly seeking new materials to enhance the performance capabilities of these engines.

Products containing both polyether (also known as polyoxyalkylene) and polyamine fragments are known as fuel disperants as disclosed in U.S. Pat. Nos. 4,234,321 and 4,261,704.

U.S. Pat. No. 4,234,321 is directed to additive products produced by reacting certain hydrocarbyl(polyoxyalkylene) alcohols with phosgene and certain polyamines to produce hydrocarbyl polyoxyalkylene ureylene carbamates.

U.S. Pat. No. 4,261,704 is directed to polyoxyalkylene polyamines prepared by first reacting a polyoxyalkylene polyol or a polyoxyalkylene glycol monoether with a halogen-containing compound. The resulting halogenated ether is then aminated by reaction with a mono- or polyamine. The resulting products are substantially monoamine or polyamine derivatives useful as intermediates for preparing cationic surfactants, cationic polymers and also as fuel detergent additives. The dispersants disclosed by these patents are not made using diisocyanates which is a critical aspect of the present invention.

U.S. Pat. No. 4,696,755 is directed to lubricating oils containing an additive comprising hydroxy polyether amines. U.S. Pat. No. 4,699,724 is directed to additives prepared by coupling two mono-alkenyl succinimides with an aldehyde and a phenol. The above additives may be prepared in a variety of ways. None of these ways uses diisocyanates, however.

U.S. Pat. No. 3,844,965 discloses diisocyanate bridged polyether-polyamines as lubricant dispersants. This patent mentions $C_{30}$ to $C_{200}$ hydrocarbyl substituted amines whereas the polyamines in our work are described as $C_6$ to $C_{30}$ hydroxyhydrocarbyl substituted amines and the diisocyanates are attached to the amines through carbamate linkages whereas the U.S. Pat. No. '965 utilizes urea linkages. Further, no mention is made of fuel applications or compositions.

Polyamine-containing dispersants are therefore well known in the art; however, the modifications described herein are novel and result in products exhibiting excellent multifunctional properties. These products have all of the primary and secondary nitrogens of the polyamine converted into tertiary amines. This improves the oxidative stability of the products. The incorporated polyether provides the solubility needed for good dispersancy. It should also provide better oxidative stability than polyisobutylene-containing dispersants.

It is accordingly, very desirable for lubricant and fuel compositions to have multifunctional, detergent/dispersancy/antioxidant additives which effectively control the buildup of deleterious materials in such intake systems of internal combustion engines as the carburetor, fuel injectors, and valves.

SUMMARY OF THE INVENTION

The present invention provides reaction products in which polyethers connected to hydroxyalkylated polyamines using diisocyanates have been found to be effective ashless dispersants and detergents for fuels and lubricants. The products are prepared by reacting a suitable diisocyanate with a polyether and then (usually catalytically) reacting the resultant intermediate product with a suitable hydroxyalkylated polyamine to obtain the desired final product. More particularly, this invention is directed to fuel and lubricant compositions containing a major amount of a liquid hydrocarbon fuel or lubricant and minor amounts of an additive product comprising a polyether connected to a hydroxyalkylated polyamine via a diisocyanate. These additives impart detergency/dispersancy and antioxidant characteristics to the compositions.

DESCRIPTION OF SPECIFIC EMBODIMENTS

Polyethers are attached to hydroxyalkylated polyamines using diisocyanates to give a structure represented by, but not limited to, the structure given below. Polyethers can be made from lower olefin oxides such as ethylene, propylene, or butylene oxides with butylene oxide being preferred or mixtures thereof. The polyether can be mono-capped or not capped. A catalyst, such as triethylamine or diazabicyclooctane, may be used in the reaction. Although any suitable catalyst known in the art may be used. This intermediate product is added at room temperature to a hydroxyalkylated polyamine dissolved in an inert hydrocarbon solvent. Any suitable inert hydrocarbon solvent may be used. However, toluene or a similar hydrocarbon solvent is preferred. A generalized method of preparation is as described below.

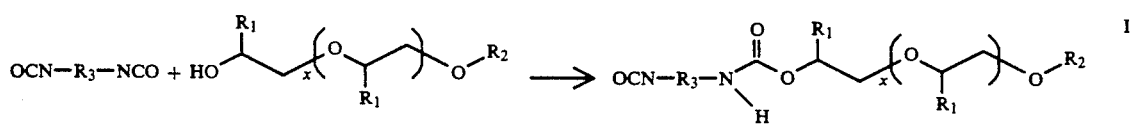

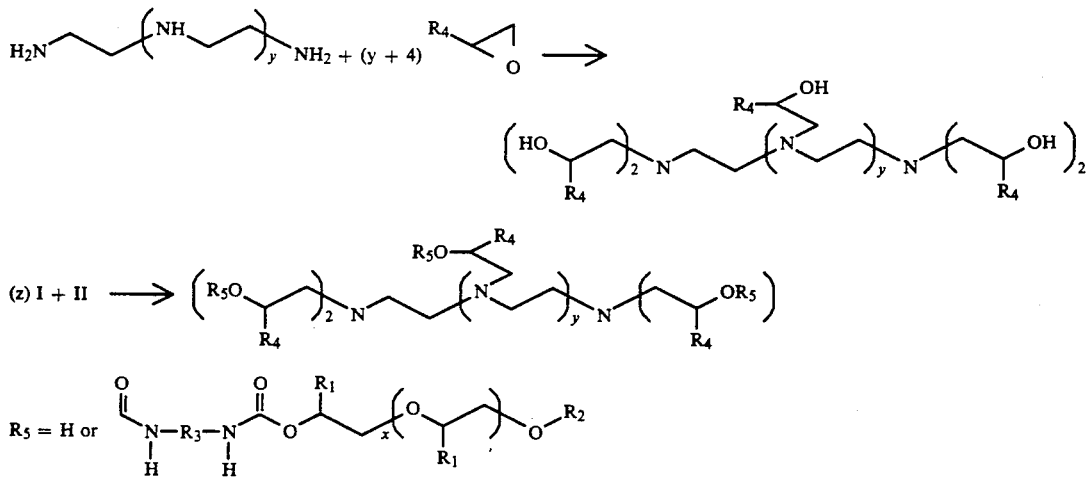

In the first step a diisocyanate where $R_3$ is $C_1$ to about $C_{60}$ alkyl, aryl, arylalkyl, or alkaryl is reacted with a polyether in which $R_1$ and $R_2$ are independently hydrogen or a $C_1$ to $C_{10}$ alkyl, aryl, arylalkyl, or alkaryl group and x equals 2 to 100. The polyether can contain all of the same $R_1$'s or several independent $R_1$'s. In a separate step, a polyamine in which y equals 0 to 4 is reacted with y+4 equivalents of an epoxide in which $R_4$ is hydrogen or a $C_1$ to $C_{30}$ alkyl, aryl, arylalyl, or alkaryl group. The products of the above two steps are then reacted with the ratio z being 1 to y+4.

The polyamine can contain any primary or secondary amine and combinations thereof. For example, ethylene diamine, diethylene triamine, triethylene tetramine, tetraethylene pentamine, pentaethylene hexamine, and their corresponding propylene amines.

Other suitable amines include but are not limited to triamines such as N-oleyl diethylenetriamine, N-soya diethylenetriamine, N-coco diethylene triamine, N-tallow diethylenetriamine, N-decyldiethylenetriamine, N-dodecyl diethylenetriamine, N-tetradecyl diethylenetriamine, N-octadecyl diethylenetriamine, N-eicosyl diethylenetriamine, N-triacontyl diethylenetriamine, N-oleyl dipropylenetriamine, N-soya dipropylenetriamine, N-coco dipropylenetriamine, N-tallow dipropylenetriamine, N-decyl dipropylene triamine, N-dodecyl dipropylenetriamine, N-tetradecyl dipropylenetriamine, N-octadecyl dipropylenetriamine, N-eicosyl dipropylenetriamine, bis-(3-aminopropyl) piperazine, (3-aminopropyl) morpholine, N-triacontyl dipropylenetriamine, the corresponding N-$C_{10}$ to $C_{30}$ hydrocarbyl dibutylenetriamine members as well as the corresponding mixed members, as for example, the N-$C_{10}$ to $C_{30}$ hydrocarbyl dibutylenetriamine members as well as the corresponding mixed members, as for example, the N-$C_{10}$ to $C_{30}$ hydrocarbyl ethylenepropylenetriamine, N-$C_{10}$ to $C_{30}$ hydrocabyl ethylenebutylenetriamine and N-$C_{10}$ to $C_{30}$ hydrocarbyl propylenebutylenetriamine.

Some typical examples of suitable isocyanates include but are not limited to 2,4-tolylene diisocyanate, 4,4'-diphenyl diisocyanate, 4,4'-diphenyl methane diisocyanate, dianisidine diisocyanates, 1,5-naphthalene diisocyanate, 4,4'-diphenyl ether diisocyanate, p-phenylene diisocyanate, trimethylene diisocyanate, tetramethylene diisocyanate, tetramethylxylene diisocyanate, trimethylhexamethylene diisocyanate, hexamethylene diisocyanate, ethylene diisocyanate, cyclohexylene diisocyanates, nonamethylene diisocyanate, octadecamethylene diisocyanate, 2-(dimethylamino) pentylene diisocyanate, tetrachlorophenylene-1,4-diisocyanate, 3-heptene diisocyanate, transvinylene diisocyanate, and isophorone diisocyanate, preferred is tetramethylxylene diisocyanate.

Any suitable alkylene or arylene epoxide may be used herein. Some such examples include but are not limited to butylene oxide, propylene oxide, ethylene oxide, styrene oxide and the like.

The polyether is generally added to the diisocyanate in a 1:1 ratio. The epoxide is added to the polyamine in a ratio of X:1, where X is the number of N-H bonds on the polyamine. The adduct of the polyether and the diisocyanate is added to the adduct of the polyamine and the epoxide (hydroxyalkylated polyamine) in a ratio of 1:1 to 1:(y+4) where y is as above.

In general any suitable liquid fuel or hydrocarbonaceous fuel, more specifically liquid hydrocarbon fuel, is suitable for use in this invention. This particularly includes gasoline motor fuels, both leaded and unleaded, regular as well as high octane. Also intended within this definition are alcohols, ethers, gasohol, mixtures thereof and fuel oils and distillates. The concentration necessary for the additive products to be effective depends upon the type of fuel or lubricant employed and the presence or absence of the detergents, dispersants and other additives, etc. Generally, the products of this invention can be added to the fuel in amounts of about 25 lbs. to about 500 lbs. per 1,000 bbls. of fuel.

The products of this invention can be added to a lubricant at about 0.1% to about 10% by weight based on the total weight of the composition.

In gasolines other additives are also generally present, for example, antiknock agents such as tetramethyl or tretraethyl lead, or other dispersants or detergents. Also included may be lead scavengers, particularly used with additives is a fuel soluble carrier oil.

The lubricants contemplated for use with the products herein disclosed include mineral and synthetic oils of lubricating viscosity, mixtures of mineral oils, mixtures of synthetic oils and mixtures of mineral and synthetic oils. The synthetic hydrocarbon oils include long-chain alkanes such as cetanes and olefin polymers such as oligomers of hexene, octene, decene, and dodecene, etc. The products of this invention are especially effective in synthetic oils formulated using mixtures of synthetic hydrocarbon olefin oligomers and lesser amounts of hydrocarbyl carboxylic ester fluids. Other synthetic oils, which can be mixed with a mineral or synthetic hydrocarbon oil, include (1) fully esterified ester oils, with no free hydroxyls, such as pentaerythritol esters of monocarboxylic acids having 2 to about 20 carbon atoms, trimethylolpropane esters of monocarboxylic acids having 2 to about 20 carbon atoms, (2) polyacetals and (3) siloxane fluids. Especially useful among the synthetic esters are those made from polycarboxylic acids and monohydric alcohols. More preferred are the ester fluids made by fully esterifying pentaerythritol, di- and tripentaerythritol or mixtures thereof with an aliphatic monocarboxylic acid containing from 1 to about 20 carbon atoms, or mixtures of such acids.

As hereinbefore indicated, the aforementioned additives can be incorporated into grease compositions. When high temperature stability is not a requirement of the finished grease, mineral oils having a viscosity of at least 40 SSU at 150° F. are useful. Otherwise those falling within the range of from about 60 SSU to about 6,000 SSU at 100° F. may be employed. The lubricating compositions of the present invention, containing the above-described additives, are combined with a grease-forming quantity of a thickening agent. For this purpose, a wide variety of materials can be dispersed in the lubricating oil in such degree as to impart to the resulting grease composition the desired consistency. For example, soap thickeners, e.g., calcium and lithium soaps may be used. Non-soap thickeners, such as surface-modified clays and silicas, aryl ureas, calcium complexes and similar materials may also be used. In general, grease thickeners are employed which do not melt or dissolve when used at the required temperature within a particular environment, however, in all other respects, any material which is normally employed in thickening or gelling oleaginous fluids or forming greases may be used in the present invention.

The following examples are presented to illustrate specific embodiments of this invention and are not to be interpreted as limitations upon the scope thereof.

EXAMPLES

EXAMPLE 1

103.2 gm (1.0 mol) of diethylene triamine was charged to a 500 ml reactor equipped with an $N_2$ inlet, thermometer, mechanical stirrer, and addition funnel charged with 382.1 gm (5.3 mol) of butylene oxide. The reaction was heated to 110° C. and the butylene oxide was added dropwise over two hours. External heating was discontinued and a cooling bath was added about half way through the addition to control the exotherm. The reaction was heated at 110° C. for an additional hour after the addition was complete. It was then stripped via rotary evaporation and was filtered through a bed of celite. The resulting product was a clear orange, viscous liquid.

EXAMPLE 2

The procedure from Example 1 was followed with the following exceptions: tetraethylene pentamine was used in place of diethylene triamine, and the ratio tetraethylene pentamine to butylene used was 1:7.3.

EXAMPLE 3

The procedure from Example 1 was followed with the following exceptions: ethylene diamine was used in place of diethylene triamine, and the ratio of ethylene diamine to butylene oxide used was 1:4.2.

EXAMPLE 4

The procedure from Example 1 was followed with the following exceptions: six equivalents of propylene oxide were used instead of the 5.3 equivalents of butylene oxide and the addition was done at ca. 50° C.

EXAMPLE 5

A two liter reactor equipped with a Dean Stark trap, thermometer, overhead stirrer, and $N_2$ inlet was charged with 61.1 g tetramethylxylene diisocyanate (0.25 mole), 545.0 g butanol-initiated polybutylene oxide (0.25 mole), 0.3 g 1,4-diazabicyclo [2.2.2] octane (0.0025 mole) and 100 ml xylenes. The reaction was brought to 200° C. by removing solvent through the Dean Stark trap and was refluxed at this temperature for 21 hours. The reaction was stripped via rotary evaporation and filtered through a bed of celite filter aid.

EXAMPLE 6

The procedure from Example 5 was followed with the following exceptions: 983 molecular weight butanol-initiated polybutylene oxide was used and the reaction was run at 150° C.

EXAMPLE 7

The product from Example 5 (97.0 g, 0.04 mole), the product form Example 2 (13.9 g, 0.02 mole), 0.1 g 1,4-diazabicycl [2.2.2] octane (0.0008 mole) and 100 ml toluene were charged to a 500 ml reactor equipped with a Dean Stark trap, thermometer, overhead stirrer, and $N_2$ inlet. The reaction was refluxed for five hours at which time an infrared spectrum showed no remaining isocyanate peak (ca 2300 $cm^{-1}$). The reaction was stripped of solvent via rotary evaporation and filtered through a bed of celite filter aid.

EXAMPLE 8

The procedure from Example 7 was followed with the following exception: The product from Example 1 was substituted for the product from Example 2.

EXAMPLE 9

The procedure from Example 8 was followed with the following exception: The ratio of the product from Example 1 to the product from Example 5 was changed from 1:2 to 1:1.

EXAMPLE 10

The procedure from Example 7 was followed with the following exceptions: The product from Example 4 was substituted for the product from Example 2 and the product from Example 6 was substituted for the product from Example 5. In addition, 1,4-diazabicyclo [2.2.2] octane was not used.

EXAMPLE 11

The procedure from Example 10 was followed with the following exceptions: The ratio of the product from Example 4 to the product from Example 6 was changed from 1:2 to 1:1.

EXAMPLE 12

The procedure from Example 7 was followed with the following exceptions: The product from Example 3 was substituted for the product from Example 2 and the product from Example 6 was substituted for the product from Example 5. In addition, 1,4-diazabicyclo [2.2.2] octane was not used.

EXAMPLE 13

The procedure from Example 12 was followed with the following exception: The ratio of the product from Example 3 to the product from Example 6 was changed from 1:2 to 1:1.

EXAMPLE 14

The procedure from Example 7 was followed with the following exceptions: The product from Example 1 was substituted for the product from Example 2 and the product from Example 6 was substituted for the product from Example 5. In addition, 1,4-diazabicyclo [2.2.2] octane was not used.

EXAMPLE 15

The procedure from Example 14 was followed with the following exception: The ratio of the product from Example 1 to the product from Example 6 was changed from 1:2 to 1:1.

Evaluation of Products

Selected Examples were evaluated in the B-10 Oxidation Test described below.

B-10 Catalytic Oxidation Test

Basically, the test lubricant is subjected to a stream of air which is bubbled through at the rate of five liters per hour respectively at 325° F. for 40 hours and/or at 375° F. for 24 hours. Present in the composition are samples of metals commonly used in engine construction, namely, iron, copper, aluminum, and lead. See U.S. Pat. No. 3,682,980, incorporated herein by reference, for further details of the test.

Table 1 shows the antioxidant capabilities of these multifunctional additives at a 4% level in a fully formulated marine diesel lubricant.

TABLE 1

| B-10 Catalytic Oxidation Test 375° F., 24 hours | |
| --- | --- |
| Additive | % Δ KV |
| None | 113 |
| Example 7 | 51 |
| Example 8 | 58 |
| Example 9 | 57 |

Table 2 shows the antioxidant capabilities of these multifunctional additives at 1% level in a solvent paraffinic neutral base oil.

TABLE 2

| B-10 Catalytic Oxidation Test 325° F., 40 hours | |
| --- | --- |
| Additive | % Δ KV |
| None | 239 |
| Example 7 | 86 |
| Example 8 | 123 |
| Example 9 | 88 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

We claim:

1. A composition comprising a major amount of lubricant and a minor detergent/dispersant/antioxidant amount of a product of reaction prepared by reacting a diisocyanate with a polyether and thereafter catalytically or non-catalytically reacting the resultant intermediate product with a hydroxyalkylated polyamine to obtain the final desired product.

2. The composition of claim 1 wherein the product of reaction is prepared as generally shown below:

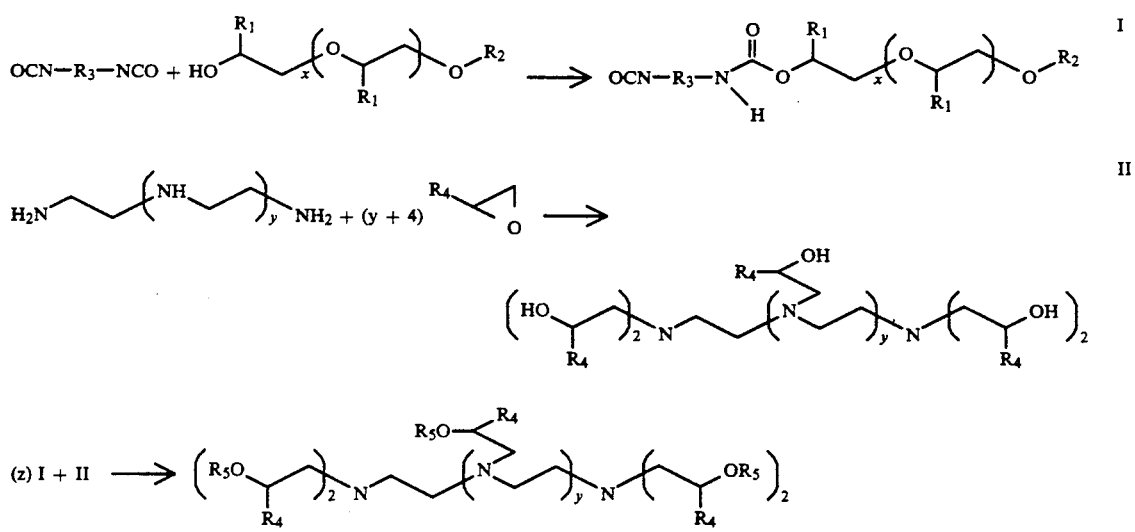

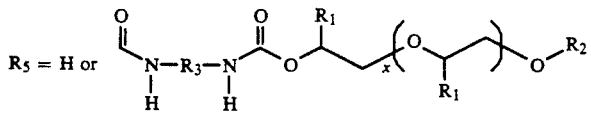

where $R_3$ is $C_1$ to about $C_{60}$ alkyl, aryl, arylalkyl or alkaryl group, $R_1$ and $R_2$ are independently hydrogen or $C_1$ to about $C_{10}$ alkyl, aryl, arylalkyl or alkaryl group $R_4$ is hydrogen or a $C_1$ to about a $C_{30}$ alkyl, aryl or arylalkyl group, and $z=1$ to $y+4$ $x=2$ to about 100 and $y=0$ to 4.

3. The composition of claim 1 wherein the hydroxylated polyamine is the product of reaction between epoxide and a polyamine selected from the group consisting of primary and secondary polyamines and mixtures thereof.

4. The composition of claim 3 wherein the polyamine is selected from the group consisting of propylenediamine, dipropylene triamine, tripropylene tetramine, tetrapropylene pentamine, and pentapropylene hexamine.

5. The composition of claim 3 wherein the polyamine is selected from the group consisting of ethylene diamine, diethylene triamine, triethylene tetramine, tetraethylene pentamine, pentaethylene hexamine, bis-(3-aminopropyl) piperazine and (3-aminopropyl) morpholine.

6. The composition of claim 5 wherein the polyamine is tetraethylene pentamine.

7. The composition of claim 5 wherein the polyamine is ethylene diamine.

8. The composition of claim 5 wherein the polyamine is diethylene triamine.

9. The composition of claim 8 wherein the diisocyanate is 2,4-tolylene diisocyanate.

10. The composition of claim 1 wherein the diisocyanate is selected from the group consisting of isophorone diisocyanate, hexamethylene diisocyanate, tetramethylxylene diisocyanate, and 2,4-tolylene diisocyanate.

11. The composition of claim 10 wherein the diisocyanate is tetramethylxylene diisocyanate.

12. The composition of claim 1 wherein the polyethers are made from epoxides selected from ethylene, propylene and butylene oxides, styrene oxide and mixtures thereof.

13. The composition of claim 12 wherein the epoxide is butylene oxide.

14. The composition of claim 12 wherein the diisocyanate is tetramethylxylene diisocyanate, the polyether is butanol-initiated polybutylene oxide, the hydroxylated polyamine is the reaction product of diethylene triamine and butylene oxide.

15. The composition of claim 1 wherein the polyethers are made from epoxides selected from the group consisting of ethylene, propylene, butylene oxide, and mixtures thereof.

16. The composition of claim 15 wherein the epoxide is butylene oxide.

17. The composition of claim 15 wherein the epoxide is propylene oxide.

18. The composition of claim 1 wherein said final product is obtained via a catalytic reaction.

19. The composition of claim 18 wherein the catalyst is 1,4-diazobicyclo [2.2.2] octane.

20. The composition of claim 1 wherein said lubricant is selected from oils of lubricating viscosity or grease prepared therefrom.

21. The composition of claim 20 wherein said oils are selected from mineral oils, synthetic oils or mixtures thereof.

22. The composition of claim 20 wherein said lubricant is a grease.

23. The composition of claim 20 comprising a major amount of an oil of lubricating viscosity or grease prepared therefrom and from about 0.01 to about 10% by weight of the product of reaction based on the total weight of the composition.

24. A product of reaction prepared by reacting a diisocyanate with a polyether and thereafter catalytically or non-catalytically reacting the resultant intermediate product with a hydroxylated polyamine to obtain the final desired product.

25. The product of claim 24 prepared in the following general manner:

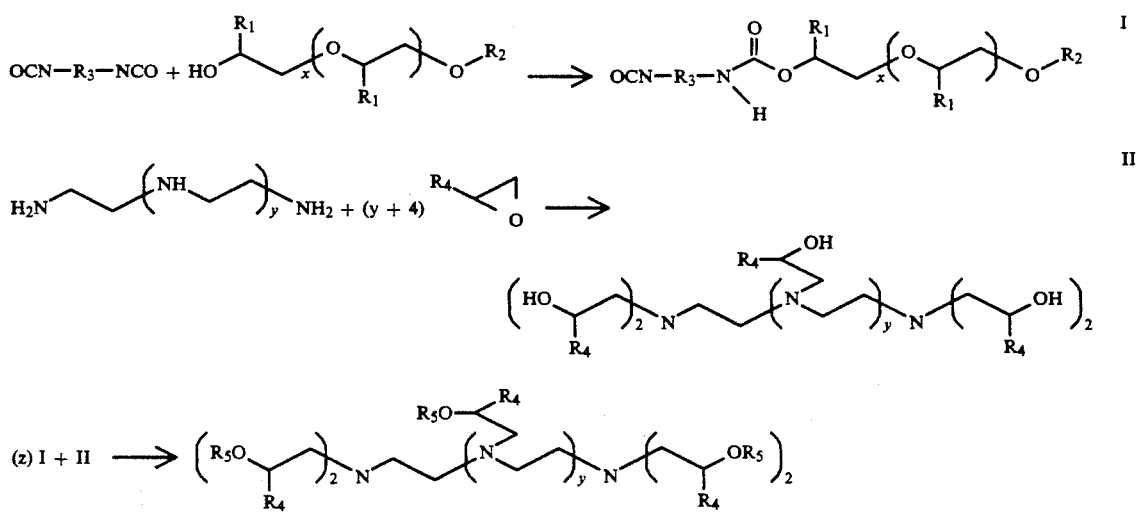

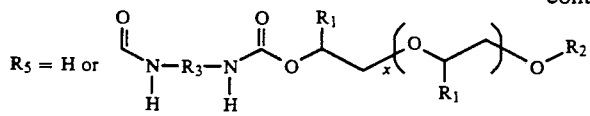

where $R_3$ is $C_1$ to about $C_{60}$ alkyl, aryl, arylalkyl or alkaryl group, $R_1$ and $R_2$ are independently hydrogen or $C_1$ to about $C_{10}$ alkyl, aryl, arylalkyl or alkaryl group $R_4$ is hydrogen or a $C_1$ to about a $C_{30}$ alkyl, aryl or arylalkyl group, and $z=1$ to $y+4$. $x=2$ to about 100 and $y=0$ to 4.

26. The product of claim 24 wherein the hydroxylated polyamine is the reaction product between epoxide and a polyamine selected from the group consisting of primary and secondary amines and mixtures thereof.

27. The product of claim 26 wherein the polyamine is selected from the group consisting of ethylene diamine, diethylene triamine, triethylene tetramine, tetraethylene pentamine, pentaethylene hexamine, bis-(3-aminopropyl) piperizine and (3-aminopropyl) morpholine.

28. The product of claim 27 wherein the polyamine is tetraethylene pentamine.

29. The product of claim 27 wherein the polyamine is ethylene diamine.

30. The product of claim 27 wherein the polyamine is diethylene triamine.

31. The product of claim 24 wherein the diisocyanate is selected from the group consisting essentially of isophorone diisocyanate, hexamethylene diisocyanate, tetramethylxylene diisocyanate, and 2,4-tolylene diisocyanate.

32. The product of claim 31 wherein the diisocyanate is tetramethylene diisocyanate.

33. The product of claim 24 wherein the polyethers are made from epoxides selected from ethylene, propylene and butylene oxides, styrene oxide and mixtures thereof.

34. The product of claim 33 wherein the epoxide is butylene oxide.

35. The product of claim 33 wherein the epoxide is propylene oxide.

36. The product of claim 24 wherein the polyamine is selected from the group consisting of propylenediamine, dipropylene triamine, tripropylene tetramine, tetrapropylene pentamine, and pentapropylene hexamine.

* * * * *